United States Patent

[11] 3,609,299

| [72] | Inventor | Jerauld G. Wright |
| | | 10 Wren Road, Ottawa, Ontario, Canada |
| [21] | Appl. No. | 23,800 |
| [22] | Filed | Mar. 30, 1970 |
| [45] | Patented | Sept. 28, 1971 |

[54] NAVIGATIONAL COMPUTER
20 Claims, 14 Drawing Figs.
[52] U.S. Cl. .................................................... 235/61 NV,
235/78, 235/61 S
[51] Int. Cl. ...................................................... G06c 27/00,
G06g 1/08
[50] Field of Search .......................................... 235/61 NV,
78, 84, 116, 61 S

[56] References Cited
UNITED STATES PATENTS
| 2,416,772 | 3/1947 | Reece | 33/142 |
| 2,775,404 | 12/1956 | Lahr | 235/61 S |
| 3,084,858 | 4/1963 | Clapp | 235/84 |
| 3,497,681 | 2/1970 | Warner | 235/78 |

Primary Examiner—Stephen J. Tomsky
Attorney—Smart & Biggar

ABSTRACT: A computer for solving aerial navigational problems in which the effect of wind speed and direction must be taken into account, wherein calibrated drift marks are provided in association with the airspeed scale. When the computer is set to any given airspeed and the information relating to wind speed and direction is registered, the calibrated drift marks give an immediate reading of the corresponding drift angle. The computer comprises a number of superimposed concentric discs which are mutually rotatable and which bear scales and cursors by means of which the required information can be derived. The computer may include means for correcting for magnetic variation in compass headings, pressure-altitude/temperature in airspeeds, and may also include scales for performing time/distance calculations.

PATENTED SEP 28 1971 3,609,299

INVENTOR
JERAULD G. WRIGHT

BY *Smart & Biggar*
ATTORNEYS.

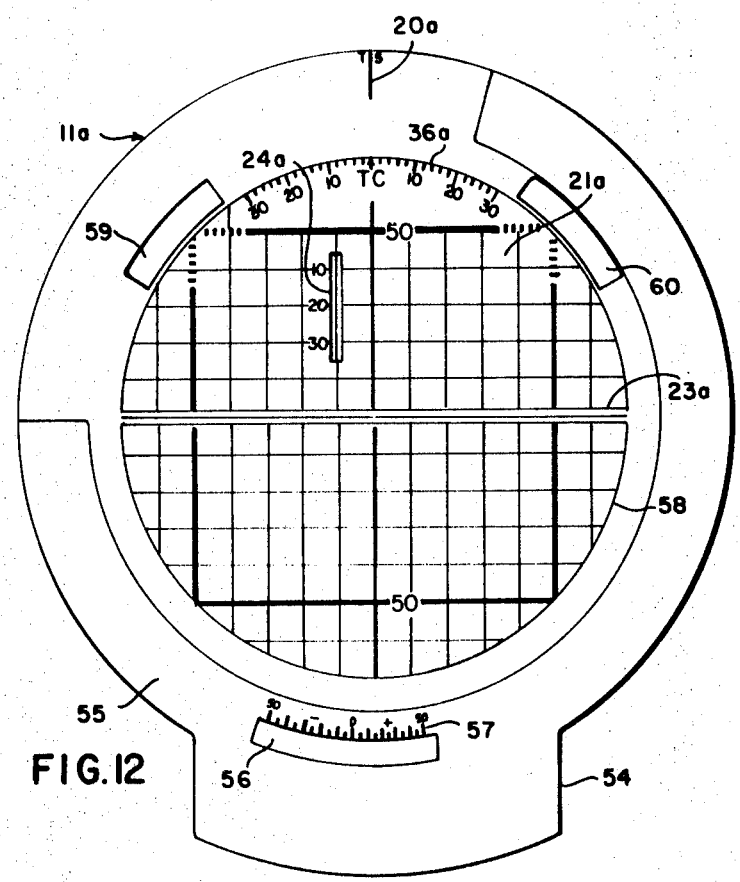

NAVIGATIONAL COMPUTER

BACKGROUND OF THE INVENTION

This invention relates to a new or improved computer for solving aerial navigation problems.

Pocket flight computers have been in use almost since the advent of the airplane and cover a wide variety of basic designs. Their common objective is to enable the pilot to calculate drift angle and ground speed having been given heading, true airspeed, and windspeed and direction, or to calculate drift angle and groundspeed given true course, windspeed and direction, and true airspeed. Solutions from other combinations of these variables are also required, in particular finding wind velocity given heading true airspeed, drift angle, and groundspeed.

DESCRIPTION OF THE PRIOR ART

In the convenient hand-held pocket-sized computers the solution is usually achieved by some sort of a graphic representation of the actual triangle of velocities involved. In such device the only part of the triangle that is of interest, and that requires to be viewed for the solution, is that within the locus of the end of the wind velocity vector. Various arrangements have been made in the past to tidy away or to dispense with the long narrow apex of the triangle which contains the drift angle which does not need to be viewed. This has been done in the past by placing the triangle on an endless band so that this long narrow apex could be tucked away behind the instrument. In other arrangements this end of the triangle is cut off and removed from the scale, thereby keeping it short and convenient to handle. Two methods have been used to enable the end of the scale to be cut off. In the one, a triangle of fixed airspeed length is used, and this is regarded as 100 percent true airspeed. Windspeed settings and groundspeed readouts in this arrangement are obtained as percentage of the airspeed in use. In other arrangements, the resultant components of the wind velocity vector of the triangle are extracted visually and converted to the necessary outputs by logarithmic scale mounted on the periphery.

In the latter device, to change the across track component of windspeed —obtained by inspection of the scale—to drift angle, it is necessary to divide the component by the true airspeed and find the angle whose sine is this ration. This requires reference to and inspection of, a logarithmic sine scale mounted on the periphery of the computer. To obtain groundspeed, it is necessary to take the other component and add it to true airspeed multiplied by the cosine of the drift angle on the logarithmic cosine scale about the periphery.

This method yields a convenient sized computer but requires that the user transfer his gaze twice to logarithmic scales on the periphery, that he carry the component value in his memory, that he find the value on the logarithmetic scale corresponding to this component valve, that he observe the drift number coincident with this value on the logarithmic scale, and that he carry his drift number in his memory as soon as he removes his gaze from the scale. The steps required for the true airspeed correction are similar, and no indicator of either the effective true airspeed or the drift angle is left to remind the operator of these important values. Another similar device of this type is disclosed in U.S. Pat. No. 2,775,404, issued Dec. 25, 1956 to H. R. Lahr.

In my invention these values are indicated clearly to the operator at all times and no transference of his gaze to the periphery of the instrument is necessary. In addition the logarithmic scales are removed so that the working parts of the instrument can be made larger by expanding the scale so as to take up this space. Removal of these scales also reduces the clutter of the instrument.

SUMMARY OF THE INVENTION

In my invention conversion of cross track displacements to drift angle is done by reference to calibrated drift marks which show through a grid plate so that both across track component and the drift angle can be read simultaneously and directly. As both these values are directly underneath the wind dot, marked or set for reference by the pilot, a continuous reference point is given against which either of these values may be read at any time without calculation or without transferring to other scales.

BRIEF DESCRIPTION OF THE DRAWINGS

The invention will further be described by way of example only, with reference to the accompanying drawings in which:

FIGS. 10 to 14 show details of the computer of FIGS. 8 and 9.

DESCRIPTION OF THE PREFERRED EMBODIMENTS

Figure 1:
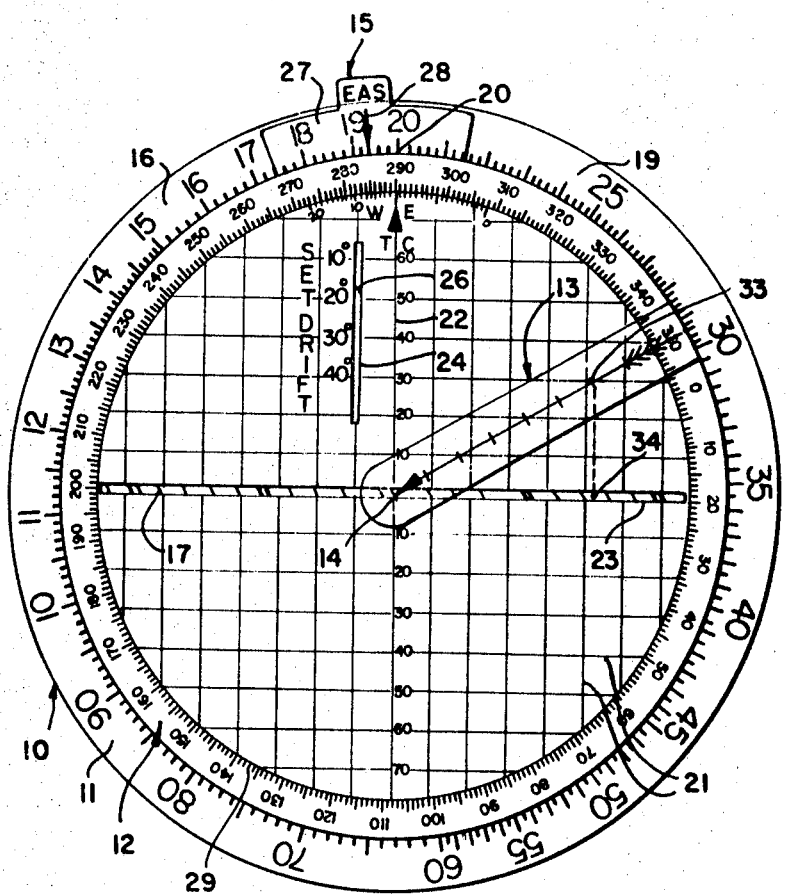
FIG. 1 is a plan view of a navigational computer according to the invention.
Figure 2:
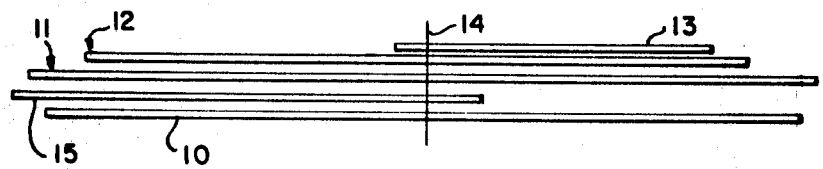
FIG. 2 is a side elevation thereof.

As shown in FIGS. 1 and 2 the computer comprises three superimposed concentric discs 10, 11 and 12 mounted to be relatively rotatable about their common axis 14. A wind vector cursor 13 is mounted above the disc 12 and extends radially from and is rotatable about the axis 14. A second cursor 15, which will be referred to as the effective air speed cursor, is mounted between the first disc 10 and the second disc 11 and is rotatable through a limited range of movement about the common axis 14. This range of movement may be defined, for example, by detents (not shown) on the underside of the disc 11.

Figure 3:
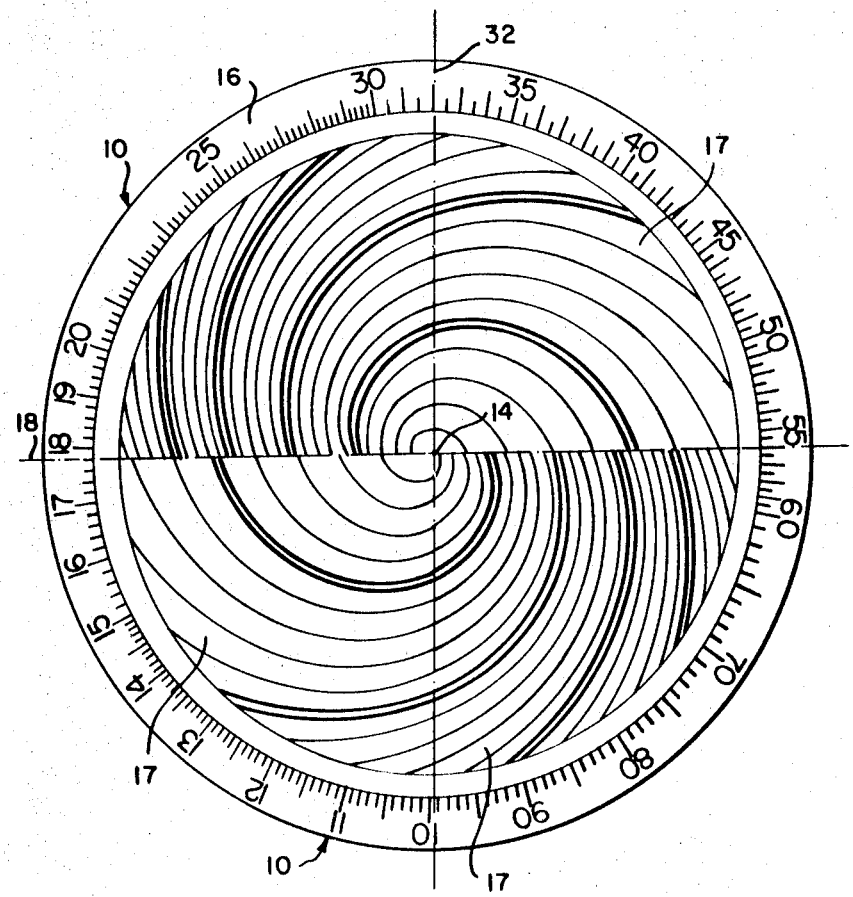
FIG. 3 is a plan view of a first disc which forms part of the computer.
Figure 4:
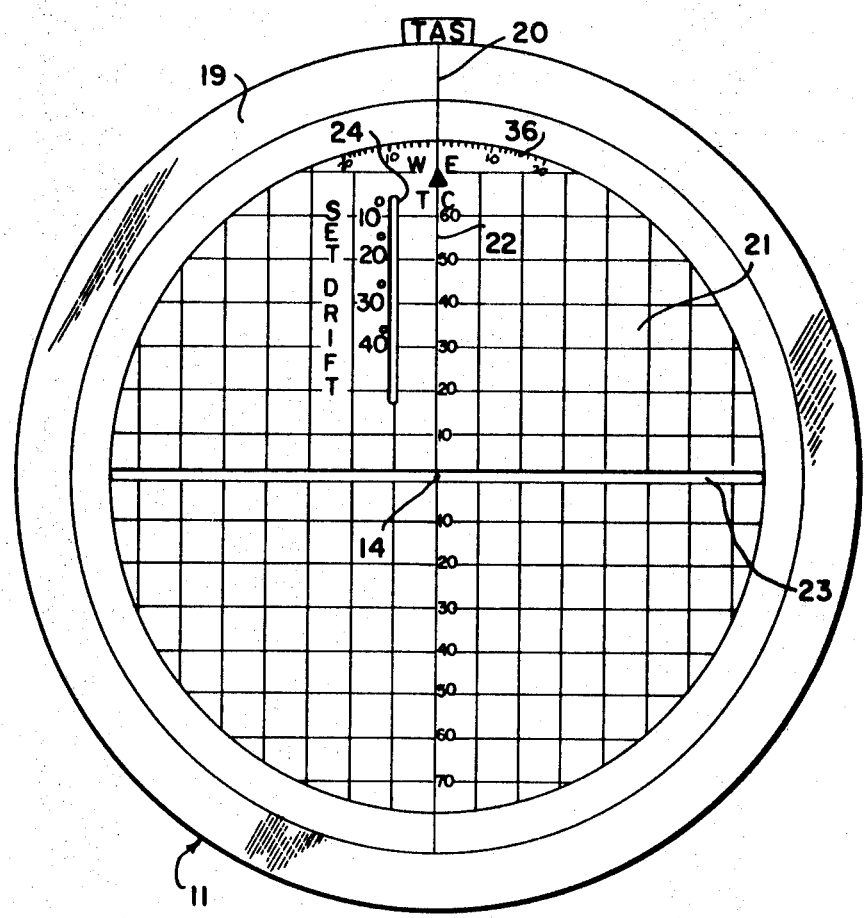
FIG. 4 is a plan view of a second disc which forms part of the computer.
Figure 5:
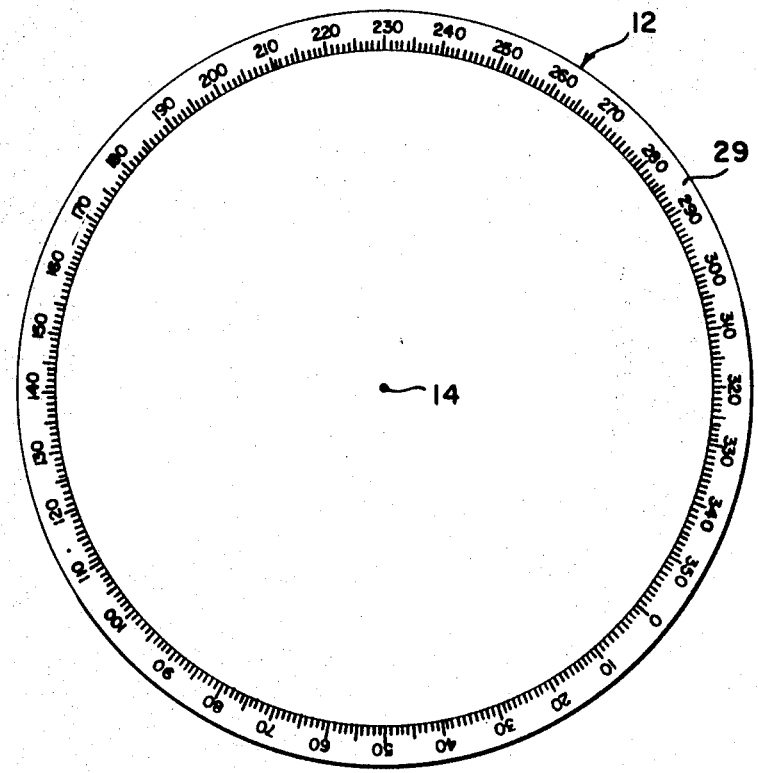
FIG. 5 is a plan view of a compass disc which forms part of the computer.

The first of lowermost disc 10 as shown in FIG. 3 is marked on the periphery thereof with a numerical airspeed scale 16. As illustrated the scale 16 is a logarithmic scale. The area of the disc 10 bounded by the scale 16 is marked with a series of spiral-like curves 17 arranged in tow identical families in the semicircular areas opposite sides of a diameter 18 of the disc. As will be explained in greater detail hereinafter the curves 17 are drawn in a manner such that they bear a particular relationship to the scale 16 and provide a direct reading of drift angle when the computer is used in the solution of aerial navigational problems.

The second disc 11 is superimposed on the first disc 10 and is of slightly greater diameter to facilitate turning of the disc 10 in use, disc 11 having a circumferential transparent band 19 at the periphery thereof and through which the airspeed scale 16 is visible. Marked on the transparent band 19 is a radial indicator line 20 identified by the letters TAS. The indicator line 20 is for the purpose of marking the true airspeed of an airplane and the disc 10 can be rotated to register this line with any selected value on the airspeed scale 16 on the first disc. The central area of the second disc 11 is opaque and covers the curves 17 on the bottom disc 10. This central area is marked with a rectilinear grid 21 of equally spaced lines, one diametral line 22 of this grid being coincident with the radial indicator line 20. The diametral line 22 is representative of the true course vector and accordingly is marked at one end with an arrow and the letters TC. The lines of the grid 21 are representative of the along track and across track component of the wind vector, and the lines at right angles to the diameter 22 are marked in units of 10 knots from the central axis 14 of the disc.

The disc 11 is provided with window means 23 extending across the full width of the grid 21 on a diameter at right angles to the diametric line 22. The window means may, as shown, comprise a narrow slot cut through the disc 11, or alternatively may comprise a narrow transparent band in the otherwise opaque gridded area of the disc. A second window means 24 is provided in the disc 11 and comprises a second narrow slot or transparent strip which extends parallel to the diameter 22 and is marked with an angular scale as shown to represent values of drift angle.

Figures 6, 7:
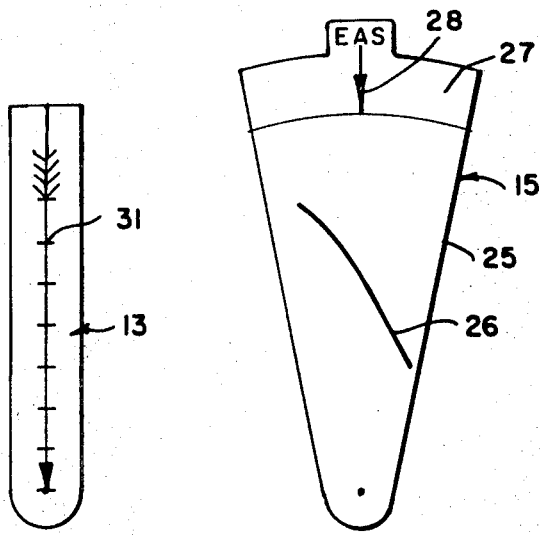
FIGS. 6 and 7 are plan views of a wind vector cursor and an effective airspeed cursor respectively which form part of the computer.

The effective airspeed cursor 15 is mounted to rotate about the axis 14 and is positioned between the first and second discs. As shown in FIG. 7 the cursor 15 comprises an opaque area 25 on which is marked a calibrated curve 26 and which lies beneath the second disc 11 and can be read through the window 24. The cursor 15 has an outer segmental transparent area 27 which lies over the airspeed scale 16 and which carries a radial indicator line 28 identified by the letters EAS.

The third disc of the computer is the compass disc 12 which is superimposed on the second disc 11. The compass disc 12 is of transparent material and is marked at this periphery with a compass scale 29 from 0° to 360°. This scale may be registered with respect to the true course indicator line 22 by rotation of the compass disc 12.

The wind vector cursor 13 comprises a radially extending arm of transparent material mounted above the compass disc 12 to rotate about the common axis 14. The cursor 13 carries an arrow 30 which has markings 31 thereon which corresponds to the windspeed scale of the grid lines 21.

In the assembled condition of the computer as shown in FIG. 1 the grid markings 21 are visible through the transparent compass disc 12 as are those portions of the curves 17 which are registered with the window means 23, and that portion of the curve 26 which is registered with the second window means 24.

It will readily be appreciated that if the compass disc 12 is rotated to register a selected course against the course line 22 on the second disc 11, and a wind vector of a selected magnitude is marked upon the arrow 30 of the cursor 13 to terminate at the axis 14, and the wind vector 13 is then rotated until the radial direction of the arrow 30 registers with a particular wind direction, then the projection of this wind vector on the diametrical line 22 and the window means 23 when read against the scale of the grid lines 21 will give an immediate readout of the along track and across track components respectively of the wind vector. The projection of the end of the wind vector will register with the curves 17 visible through the window means 23, and these curves 17 are drawn in such a manner in relation to the airspeed scale 16 on the first disc that, for a given airspeed as registered by the indicator line 20 upon the airspeed scale 16, the portion of each of the curves 17 visible through the window means 23 registers with a position on the window means 23 displaced from the axis 14 by a distance corresponding to a crosswind vector component which will result in a drift angle of a magnitude corresponding to the angle represented by said curve, upon an aircraft flying at the airspeed indicated by line 20. Thus each of the curves 17 represents a particular drift angle, the curves being drawn to represent drift angles at intervals of 2°, drift angles of 10° or multiples thereof being represented by closely spaced double curved lines or otherwise marked so as to be easily recognizable. The two families curves 17 and represent drift angles to left and to right of track respectively.

The actual form of the curves 17 is of course dependent upon the nature of the airspeed scale 16. For the logarithmic airspeed scale 16 illustrated in the drawings it is found that the curves 17 approximate to loxodromes or logarithmic spirals.

The airspeed scale 16 need not necessarily be either linear or logarithmic. For example portions of this scale, perhaps at frequently used airspeed ranges, may be expanded to occupy a greater length of the periphery of the disc 10. In any event the airspeed scale should be of such a nature that when the corresponding drift angle curves 17 are drawn these curves should intersect all radii of the disc 10 at a large acute angle, so that when viewed through the window means 23 each curve cuts sharply across the window means slot and does not extend in the lengthwise direction of the slot by a significant amount as this would render readout of the drift angle difficult.

As shown in FIG. 3 the families of curves 17 are arranged on opposite sides of a diameter 18 of the disc 10 and correspond to drift angles in the airspeed range of 100 knots to 320 knots, i.e. airspeed readings to the left of the diameter 32 of the disc 10 (see FIG. 3).

For this airspeed range the grid lines 21 on the disc 11 represent increments of 10 knots of windspeed. Thus the computer illustrated is equipped to solve aerial navigational problems involving airspeeds in the range of 100 to 320 knots and windspeeds in the range 0 to 75 knots. However by suitable adjustment of the airspeed scale 16 and its associated curves 17, the windspeed scale of the grid lines 21, any required range of these parameters could be accommodated in a modified form of the computer.

As explained above, for a given airspeed and windspeed and direction, the resultant drift angle can readily be arrived at. The effective airspeed cursor 15 is adapted to cooperate with the drift scale marked on the second window means 24 in the second disc 11 to arrive at an airspeed along track or effective airspeed and the groundspeed is calculated by summing this figure with the headwind or tailwind component as projected by the windspeed vector upon the diameter 22 of the second disc 11. The curve 26 on the effective airspeed cursor 15 is calibrated for this purpose. The cursor 15 is rotated to register the portion of the curve 26 which is visible through the window means 24 with the calculated drift angle on the associated scale whereupon the radial indicator line 28 on this cursor is registered with the airspeed along track or effective airspeed on the scale 16. The window means 24 need not necessarily lie parallel to the diameter 22 and has been provided in this manner mainly for the sake of neatness and to prevent undue clutter on the face of the disc 11. Depending on the particular configuration of the window means 24 chosen, the curve 26 is drawn accordingly so that the correct effective airspeed will be indicated by the cursor indicator line 28. As with the curves 17 and the window means 23, so the relationship between the curve 26 and the window means 24 should be such that throughout the range of drift angles covered by the associated scale the curve 26 should cross the slot of the window means 24 at a large acute angle so that setting of the cursor 15 with the curve 26 registered against the appropriate drift angle presents no particular problems.

The computer can also be provided with a magnetic variation subscale such as that indicated at 36 on the second disc 11. The compass scale 29 can be registered with the requisite magnetic variation on the subscale 36 to eliminate errors due to the magnetic variation in the solution of navigational problems.

The following is an example of the use of the computer in solving an aerial navigational problem.

Given a true airspeed of 200 knots a true course of 290° and a windspeed of 60 knots from a direction of 350° let us assume that it is required to calculate 1. the drift angle
2. the aircraft heading, and
3. the groundspeed.

To solve this problem the parts of the computer are moved into the relative positions indicated in FIG. 1 of the drawings. Firstly, the second disc 11 is rotated until the indicator line 20 registers with the value 200 on the airspeed scale. Next, the compass disc 12 is rotated until the value 290° registers against the course marked on the diameter 22 of the second disc 11. The windspeed is then marked off along the arrow 30 of the cursor 13 to give a wind point 33 and the cursor is then rotated to register with the wind direction of 350°. These parts of the computer now occupy the relative positions shown in FIG. 1.

The projection of the wind point 33 upon the diameter 22 gives an immediate reading of the headwind component as 30 knots. The projection of the wind point 33 upon the window means 23 read off against the portions of the curves 17 visible therethrough gives an immediate readout of the drift angle as approximately midway between 14° and 16°, i.e. 15°. The drift angle value is arrived at by counting the number of curves 17 between the axis 14 of the computer and the projected point 34. It will be seen that there are first four single curves, then a double curve representing 10°, and then two single curves each representing 2°. Thus the point 34 represents a drift angle of 14° plus half the distance to the next outermost of the curves 17, or approximately 15° in all. The aircraft heading is therefore 290° plus the drift angle of 15°, i.e. 305°.

The effective airspeed cursor 15, is then adjusted to bring the portion of the curve 26 which is visible through the window means 24 against the position of the 15° value in the windspeed scale marked adjacent the window means 24. When this is done the cursor indicator line will then be seen to register with a value of 193 knots on the airspeed scale 16, this value representing the airspeed along track or effective airspeed.

The groundspeed is then calculated by summing the effective airspeed with the headwind or tailwind component. From the projection of the wind dot 33 upon the diameter 22 it will be seen that there is a headwind of 30 knots, therefore the groundspeed is 193 minus 30 knots or 163 knots.

The computer can also be used for solving other navigational problems involving the same quantities but with different unknowns. For example if groundspeed the true airspeed, true heading and drift angle are known it may be required to calculate the speed and direction of the wind. This problem is solved as follows:

1. The indicator 20 is set against the true airspeed on the scale 16.
2. The course made good, i.e. the heading plus or minus the drift angle is set against the heading marker on the line 22.
3. The effective airspeed cursor is set so that the curve 26 registers against the known drift angle on the scale at the window means 24.
4. The difference between the groundspeed and the effective airspeed as marked by the indicator 28 on the scale 16 gives the headwind or tailwind component. This is marked upon the diameter 22.
5. The crosswind component is marked on the window means 23 from the drift line, and the projection of the crosswind and head or tailwind components on the grid lines 21 intersect at the wind dot. The wind vector cursor is then registered with the wind dot and gives an immediate indication of the speed and heading of the wind.

Where the heading, true airspeed, and windspeed and direction are known the true course and groundspeed may be calculated as follows:

1. The true airspeed is as before set on the scale 16 by the indicator 19.
2 The wind dot is marked on the compass disc 12.
3. The known heading is set against the heading marker on diameter 22 and the corresponding drift value from the wind dot is noted on the drift scale in the window means 23.
4. The true course is then offset from the heading marker by the amount of this drift repeatedly until the true course offset is equal to the drift scale value indicated by the position of the wind dot. With the heading now known the groundspeed can be calculated as in the first example described above.

The computer herein described is designed primarily for solving problems wherein the known information includes the aircraft course. However it could equally well be designed to solve problems wherein the known information includes a true heading and in this case the marking on the diameter 22 would represent the true heading setting. A computer could of course be designed for the solution of both types of problems by the provision of a second suitably adjusted, airspeed scale occupying the unused half of the periphery of the first disc 10 and utilizing the same drift curves 17. The true heading marker could for example be provided at the opposite end of the diameter 22 and a corresponding drift set window means and effective airspeed cursor provided.

The computer can of course include, perhaps on its reverse side all of the additional scales, such as pressure/altitudes-temperature, which are commonly provided on computers of this type.

Further, if the airspeed scale is logarithmic, a cursor can be added which can be offset by a superimposition of height and temperature scales so that indicated airspeed, can be set, with the conversion to true airspeed taking place automatically at the true course indicator line 20.

The computer illustrated in FIGS. 8 to 14 is similar to the one described above but has been modified by the addition of a scale to apply a pressure-altitude/air temperature correction to the indicated airspeed, and scales for carrying out time/distance calculations.

Figure 10:
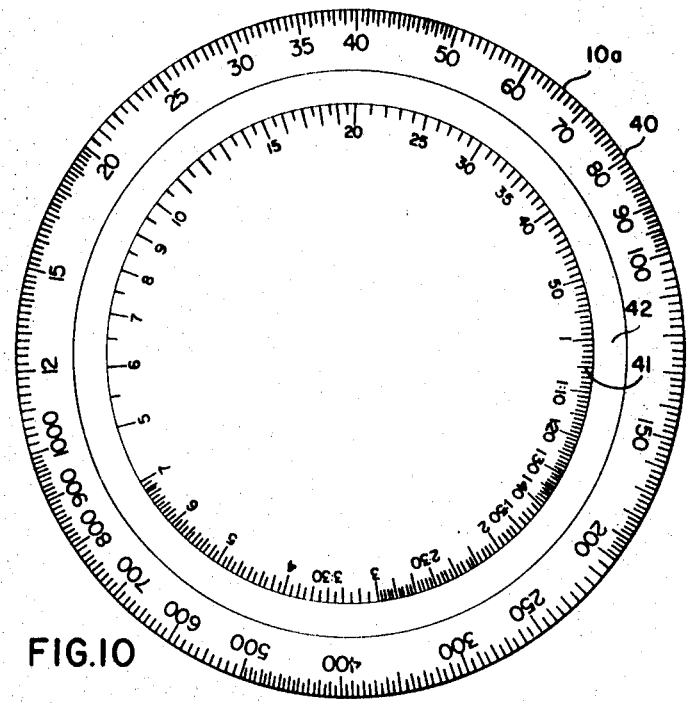

FIG. 10 is an underneath plan view of the bottom disc 10a of the modified computer, and this modified computer, and this will be seen to include scales for carrying out time/distance calculations, namely, a peripheral distance scale 40 and a concentric time scale 41, the latter of which is adjacent a transparent ring 42 formed in the disc 10a. The upperside of the disc 10a (not shown) carries a series of spiral curves similar to those shown in FIG. 3.

Figure 11:
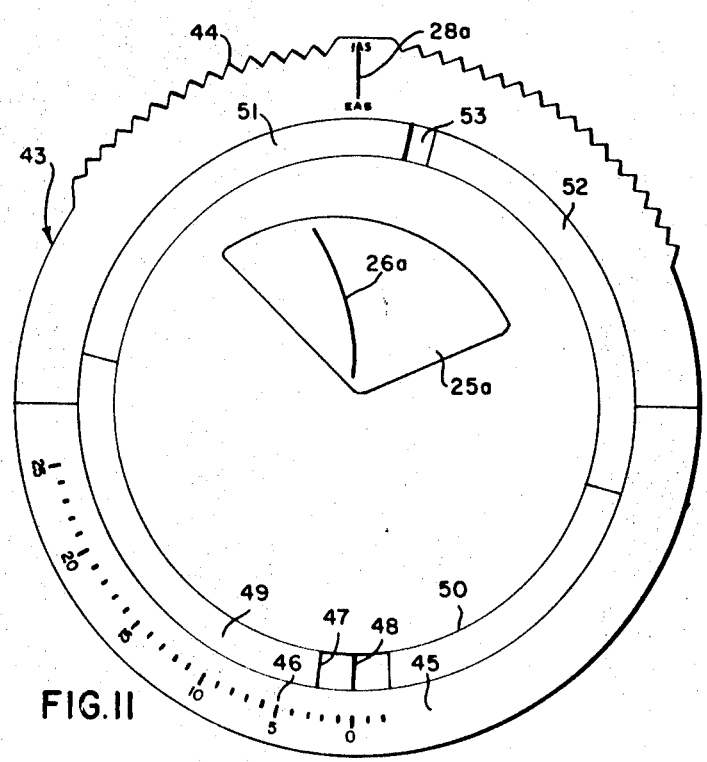
Figure 14:
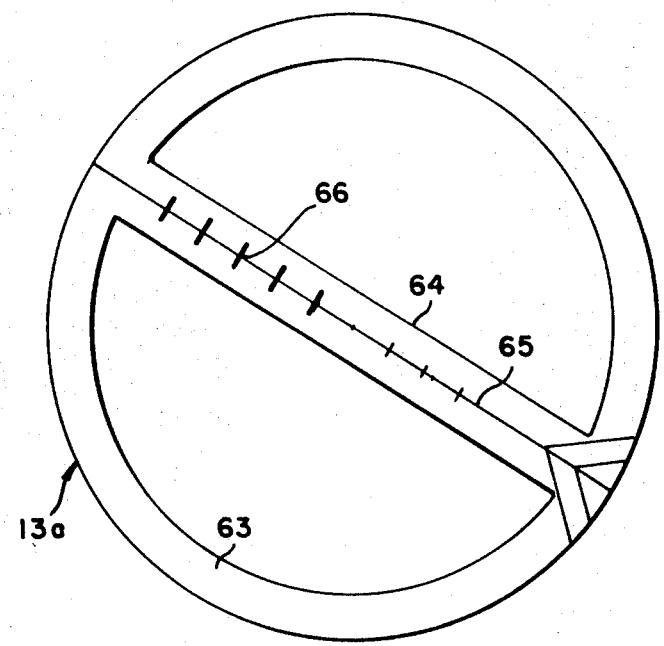

The effective airspeed cursor of the embodiment shown in FIG. 1 to 7, is replaced in the present embodiment by a cursor disc 43, shown in FIGS. 11 and 12, in plan view, and underneath plan view, respectively. The cursor disc 43 has a diameter substantially equal to the diameter of the bottom disc 10a, and over a portion of its periphery carries a notched driving track 44 which extend substantially beyond the diameter of the disc. The cursor disc is generally of transparent material, but has an opaque area 25a on the upperside of which is marked a curve 26a provided as before for the purpose of applying a drift angle correction to the calculated airspeed. In a transparent peripheral portion of the cursor disc 43 a radial indicator line 28a is marked identified at its outer end of the letters IAS (representing indicated airspeed), and at inner end are the letters EAS (representing effective airspeed, sometimes referred to as groundspeed base).

An opaque peripheral portion 45 of the cursor disc is marked with a pressure/altitude scale 46 which may be given any convenient range, for example, as illustrated 0 to 25,000 feet. A concentric band on the cursor disc 43 is formed at one location with a transparent window 47 marked with a radial cursor 48. Portions 49 and 50 of the concentric band adjacent to window 47 are opaque and bear on the underside of the disc the legend "GROUND SPEED." The remaining ares of the concentric band are perforated and define two arcuate slots 51 and 52 separated by a neck 53 to which the peripheral portion and central portion of the cursor disc 43 are joined. In the assembled condition of the computer the concentric band of the cursor disc 43, and in particular the window 47, is visible through the transparent ring 42 of the bottom disc 10a.

Above the cursor disc 43 the computer carries a gridded disc 11a shown in top plan view in FIG. 12. As before the gridded disc has a central gridded area 21a, a magnetic variation subscale 36a, a radial indicator line 20a on a transparent peripheral portion of the disc, a window 23a for viewing the drift scale spiral curves on the bottom disc, and a window 24a marked with a drift angle scale against which the curve 26a on the cursor disc 43 can be set. For ease of viewing the transparent windows 23a and 24a each carries a central marking line thereon.

The gridded disc 11a has at its lower portion an extended tab 54 for ease of handling the computer, and an opaque band 55 extending around the major portion of its periphery. In this band 55 is provided a transparent arcuate window 56 against which is marked an air-temperature scale 57 which may, cover any desired range, conveniently from −50° to +50° C. In the assembled condition of the computer the pressure/altitude scale 46 on the cursor disc 43 is visible through the window 56 and can be registered with the air-temperature scale 57 to apply a correction to the indicated airspeed, as will later be described. The disc 11a, outside its gridded ares 21a carries a transparent ring 58 which, in the assembled condition of the computer, registers with the concentric band of the cursor disc 43 formed by the arcuate slots 51 and 52, opaque areas 49 and 50, and window 47. On the underside of the gridded disc 11a, within the width of the transparent ring 58 are carried two arcuate distance pieces 59 and 60 which, in the assembled condition of the computer, are slidably received in the slots 51 and 52 respectively of the cursor disc and limit the movement of the cursor disc with respect to the gridded disc. The distance pieces 59 and 60 are slightly greater in thickness than the cursor disc 43 so that when the gridded disc and the bottom disc 10a are pressed together in the region of either distance piece (as by gripping the corresponding portion of the computer between thumb and forefinger) the cursor disc 43 can still be rotated relative to the two other discs.

The compass disc 12a of the modified computer is generally similar to the one previously described in that it comprises a transparent central area and an opaque peripheral ring on the upperside of which is marked a compass scale. However, as shown in FIG. 13 the underside of the compass disc 12a bears a groundspeed scale 61 extending over a portion of the periphery of the opaque ring, and an indicator arrow 62 labeled "TIME." In the assembled condition of the computer, from the reverse side, the groundspeed scale 61 is visible through the window 47 and can be registered with the cursor 48. The TIME arrow 62 is also visible and can be registered with the TIME scale 41.

The wind vector cursor 13a comprises a transparent ring 63 which sits on the compass disc 12a, and a diametral band 64 marked with a diametral line 65 bearing wind scale markings 66. With this arrangement when computer is assembled and gripped in the palm of one's hand with the compass disc uppermost, the wind vector disc 13a can be engaged by the thumb to rotate the diametral line 65 (which represents the wind vector) to register with any desired compass setting.

The use of the modified computer in solving aerial navigational problems will be apparent from the following example.

Given an indicated airspeed of 134 knots at an altitude of 6,000 feet and air-temperature of −20° C., a true course of 340° and a windspeed of 40 knots from a direction of 30°, let us assume that it is required to calculate 1. The drift angle;
2. The aircraft heading, and
3. The groundspeed.

Figure 8:
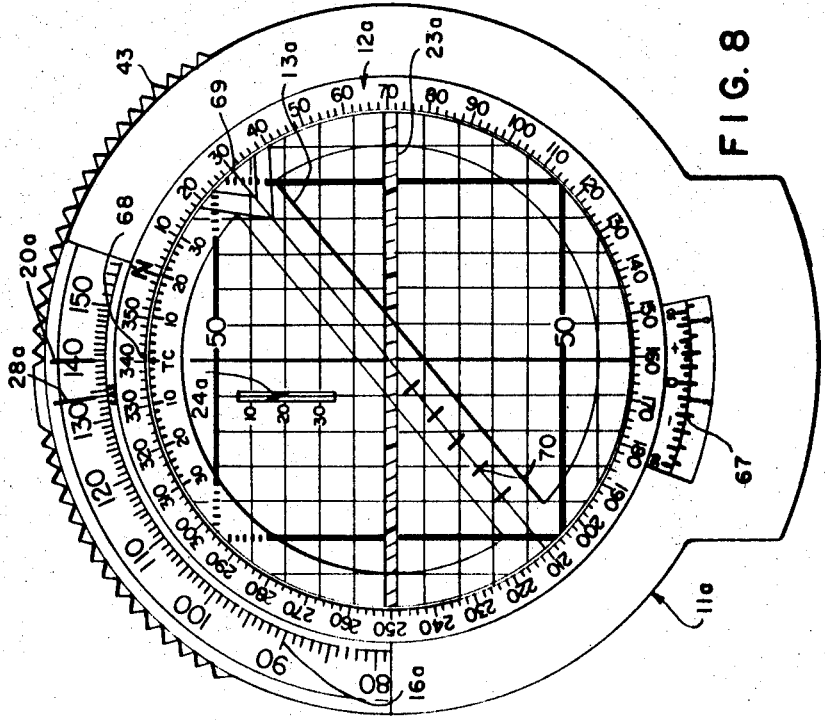

As shown in FIG. 8 the indicator line 28a on the cursor disc 43 is registered with the value 134 knots on the airspeed scale 16a on the bottom disc 10a. Next the gridded disc 11a is rotated until the value of −20° C. on the air-temperature scale 57 registers with the altitude of 6,000 feet on the pressure altitude scale 46 on the cursor disc, as indicated at the point 67 in FIG. 8. In this position the indicator line 20a on the gridded disc registers with the figure 140 knots on the airspeed scale 16a, and this represents the true airspeed.

From the given data the drift angle, and hence the aircraft heading, can be arrived at in the following manner. While maintaining the indicator line 20a registered with the value 140 knots on the airspeed scale (this being done by applying pressure between the gridded disc and the bottom disc in the region of one of the distance pieces 59, 60), the compass disc is rotated until the true course reading of 340° registers against the true course marker TC on the gridded disc as indicated at the point 68. The wind vector cursor 13a is then rotated until the line 65 registers with the wind direction of 30° as indicated at the point 69. The magnitude of the wind vector, 40 knots, is then marked off along the line 65, the marking 66 representing units of 10 knots, to arrive at a point 70 which represents the wind dot. The projection of this point upon the window 23a, read against the spiral curves 17a visible through this window, gives a direct indication of the drift angle. It will be recalled that each of the curves 17a counted from the center of the computer represents 2° of drift, and thus it will be seen that the drift angle is approximately 13°. It will be seen that the drift is to the left and therefore to maintain a course of 340° the aircraft heading must be 353°.

Maintaining the indicator line 20a registered with the value 140 knots on the airspeed scale 16a, the cursor disc 43 is rotated until the curve 26a registers with the drift angle value of 13° in the window 24a of the gridded disc. In this condition (not shown) the indicator line 28a on the cursor disc registers with a value of 136 knots on the airspeed scale 16a. This value indicated by the letters EAS represents the "effective airspeed" or the airspeed along the track. To arrive at the groundspeed it is necessary to sum this value with the headwind or tailwind component of the wind vector. From the direction of the wind vector it is immediately apparent that there is a headwind and the headwind component read against the grid markings on the gridded disc 11a is seen to be 26 knots. Thus, the groundspeed equals 136 minus 26 knots i.e. 110 knots.

Figure 9:
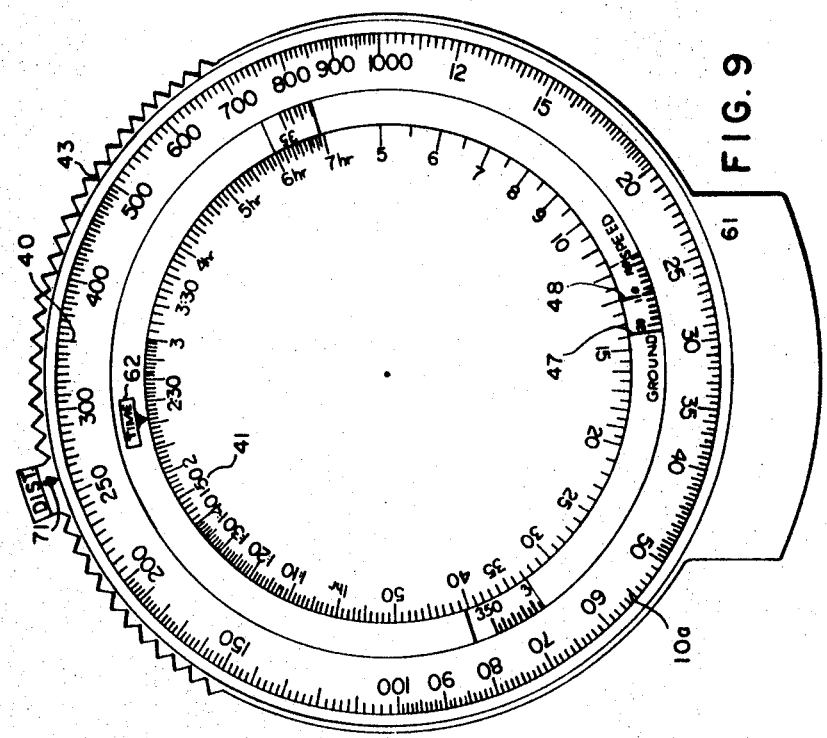
FIGS. 8 and 9 are respectively a top plan view and an underneath plan view of a modified computer.

With the information derived as above time/distance calculations can be carried out by using the scales on the reverse side of the computer and this is indicated in FIG. 9. The compass disc 12a is rotated to register the value of 110 knots of the groundspeed scale 61 with the cursor 48 in the window 47 of the cursor disc. Let us assume that with the given information and the values calculated above, it is required to determine the time necessary to reach a destination 260 miles distant. The bottom disc 10a is rotated until the figure 260 registers with the indicator line 71 marked DIST. on the reverse side of the cursor disc 43. In this conditions, the time indicator arrow 62 on the compass disc indicated the required time, namely 2 hours and about 22 minutes on the time scale 41 of the bottom disc 10a. It will be apparent that to ascertain the distance covered in a given time, the disc 10a can be rotated until the timer registers against the indicator arrow 62 whereupon the required distance can be read off on the scale 40 against the distance indicator line 71.

What I claim as my invention is:

1. A computer for solving aerial navigation problems, comprising a first disc having an arcuate scale thereon representative of airspeed, a family of curves on one side of said first disc representative of drift angles, each curve extending angularly and outwardly with respect to the center of the disc in the manner of a spiral, a second disc superimposed on said one side of said first disc and concentric therewith, said second disc being rotatable with respect to said first disc, indicator means on said second disc registrable with respect to the airspeed scale on said first disc, window means in said second disc comprising a narrow diametrical transparent band or slit through which a correspondingly narrow band of said one side of said first disc and the curves thereon can be viewed, an array of grid lines on said second disc approximately parallel and at right angles to said window means, a compass disc superimposed on said second disc, said compass disc being concentric with and rotatable relative to said first and second discs, said compass disc having a compass scale graduated from 0° to 360° thereon and registrable with respect to said indicator means, at least the central area of said compass disc being transparent to a degree sufficient that the grid lines of said second disc and the portions of the curves of the first disc registered with said window means are visible therethrough, the curves on said first disc being constructed in relation to said airspeed scale in a manner such that if said indicator means is registered with a selected airspeed and a wind vector to an appropriate scale is indicated on said compass disc in a radial direction extending to the center thereof, then the projection of said wind vector upon the window means in a direction at right angles to the latter, when read against the curves visible through the window means, gives a direct indication of the corresponding drift angle.

2. A computer according to claim 1 wherein said indicator means lies on a radius of said second disc at right angles to said window means, said radius providing a heading indicator against which the compass scale can be set.

3. A computer according to claim 2 further comprising a rotatable wind vector cursor marked in units of windspeed to a scale corresponding to the airspeed scale of said first disc.

4. A computer according to claim 1 wherein in use the projection of the wind vector upon a diameter of the second disc which lies at right angles to said window means gives a reading of the headwind or tailwind component to be subtracted from or added to the airspeed.

5. A computer according to claim 1 further comprising a rotatable cursor received between the first and second disc, a curve on said cursor, a narrow slot in said second disc through which a registering portion of said cursor curve is visible, a drift angle scale marked lengthwise of said slot and an indicator marking on said cursor adjacent said airspeed scale, said cursor curve being drawn in such a manner in relation to the location and configuration of said slot, to the drift angle scale, and to the airspeed scale that for a given airspeed, when the cursor curve is registered with the appropriate drift angle on the drift angle scale, the cursor indicator marking registers with a value on the airspeed scale which represents the airspeed along rack or effective airspeed.

6. A computer according to claim 1 wherein adjacent curves of said family of curves represent drift angles at 2° intervals.

7. A computer according to claim 6 including indicator means whereby curves representing drift angles of 10° or multiplies thereof can be readily identified.

8. A computer according to claim 7 wherein curves representing drift angles of 10° or multiples thereof are identified by being represented by closely spaced double lines.

9. A computer according to claim 1 wherein said airspeed scale is a logarithmic scale and said curves are loxodromes.

10. A computer according to claim 1 wherein said airspeed scale extends through approximately 180° of arc about the center of said first disc, and two families of said curves are provided representing drift angles to right and left of track respectively.

11. A computer according to claim 5, wherein said cursor comprises a cursor disc rotatably received between said first and second discs and having a peripheral portion extending radially outwards beyond said first and second discs.

12. A computer according to claim 11, wherein said peripheral portion includes engagement means to facilitate manual engagement and rotation thereof.

13. A computer according to claim 11 further comprising spacer means between said first and second discs and received in arcuate slot means in said cursor disc, said spacer means being slightly greater in thickness than said cursor means whereby when said first and second discs are clamped in nonrotatable relationship in the region of said spacer means, said cursor disc remains free to rotate.

14. A computer according to claim 3, wherein the wind vector cursor comprises a diametral transparent band bearing a diametral line on which said units of windspeed are marked, said band being joined at its ends to a flat transparent ring received within and rotatable with respect to said compass scale.

15. A computer according to claim 3, wherein the wind vector cursor comprises a diametral guide and an indicator element movable lengthwise of said guide so as to be capable of being set at a given position in that length to indicate a selected wind vector.

16. A computer according to claim 11, wherein said compass disc comprises a transparent disc encircled by a flat opaque ring on the upperside of which said compass scale is marked, the underside of said opaque ring being graduated in a scale representative of ground speed, further comprising viewing means in said second disc, cursor disc, and first disc whereby at least a portion of said groundspeed is visible from the underside of the computer, a groundspeed cursor registrable against said groundspeed scale, arcuate time and distance scales graduated on the underside of said first disc, indicator means on the underside of said opaque ring of the compass disc registrable with the time scale, and indicator means on the underside of said cursor disc registrable with said distance scale, whereby for a given groundspeed as registered by the groundspeed cursor solutions of time/distance calculations can be read off on the time and distance scales against the appropriate indicator means.

17. A computer according to claim 5, wherein said cursor comprises a cursor disc rotatably received between first and said second discs, said cursor disc bearing an arcuate scale on its upperside, said second disc bearing viewing means through which at least a portion of said arcuate scale on the cursor disc is visible, said second disc being an arcuate scale adjacent said viewing means and operative to register with the arcuate scale on said cursor disc upon rotation of said second disc, one of said arcuate scales being graduated in units of temperature while the other is graduated in units of pressure altitude, said cursor disc having a second indicator means registrable with said airspeed scale on said first disc, whereby said second indicator means is registered with an indicated airspeed and said second disc is rotated to register given values on said arcuate scales, said indicator means on said second disc registers with the true airspeed value on the airspeed scale corrected in respect of said given values.

18. A computer according to claim 17, wherein said cursor disc has a peripheral portion which extends radially outwards beyond said first and second disc and is adapted to be manually engaged to effect rotation of the cursor disc.

19. A computer according to claim 17, further comprising spacer means between said first and second discs received in arcuate slot means in said cursor disc, said slot means having end portions which cooperate with said spacer means to limit the range of rotation of the cursor disc, said spacer means having a thickness in excess of said cursor means, whereby when said first and second discs are clamped together in nonrotatable relationship in the region of said spacer means, said cursor disc remains free to rotate.

20. A computer according to claim 16, wherein both said arcuate time and distance scales on the underside of said first disc are double log scales.